United States Patent
Rapsilber et al.

[15] 3,639,989
[45] Feb. 8, 1972

[54] COORDINATE CONVERSION CALCULATOR

[72] Inventors: William E. Rapsilber, 3621 McKibbon Road, St. John, Mo. 63114; Richard G. Koenig, 5114 Hombert Road, Alton, Ill. 62002

[22] Filed: Dec. 8, 1969

[21] Appl. No.: 883,186

[52] U.S. Cl. ...................................33/1 SA, 235/61 GM
[51] Int. Cl. ..............................................G01b 5/24
[58] Field of Search............33/1 R, 1 SA; 235/61 GM, 61 NV

[56] References Cited

UNITED STATES PATENTS

| | | |
|---|---|---|
| 3,163,935 | 1/1965 | Webb....................................33/1 SA |
| 3,456,350 | 7/1969 | Riblet et al............................33/1 SA |
| 2,694,859 | 11/1954 | Gwillam................................33/1 SA |

*Primary Examiner*—William D. Martin, Jr.
*Attorney*—Charles B. Haverstock

[57] ABSTRACT

A calculator for converting between sets of azimuth and elevation angular coordinates which define the same direction but which are with respect to different planes, the planes being related to each other by pitch and roll angles therebetween. The calculator includes a gimbal assembly, angular scales and cooperating pointers which form a mechanical analog of the direction, the planes, and the angles therebetween. When one set of angular coordinates and the pitch and roll angles between the planes are set into the calculator, the other set of angular coordinates is indicated thereby.

15 Claims, 10 Drawing Figures

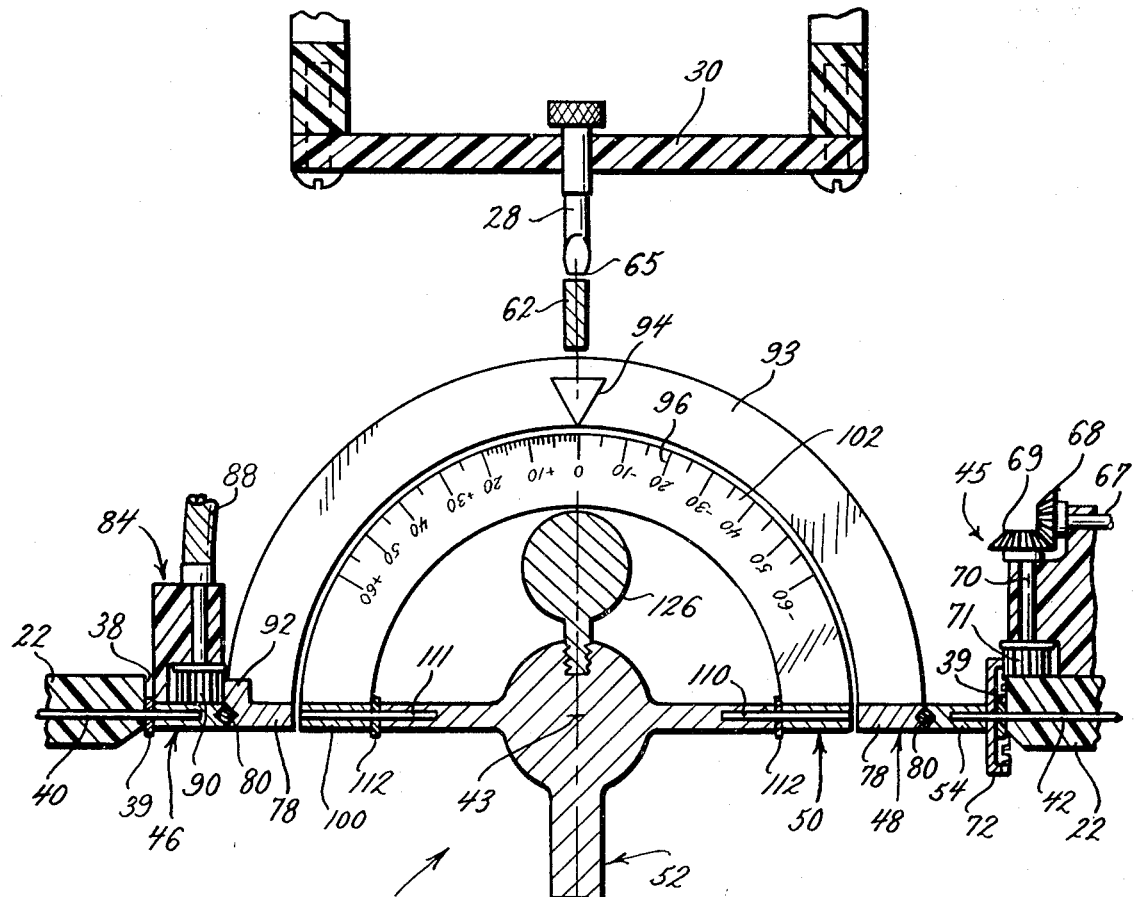
FIG. 9.  FIG. 8.
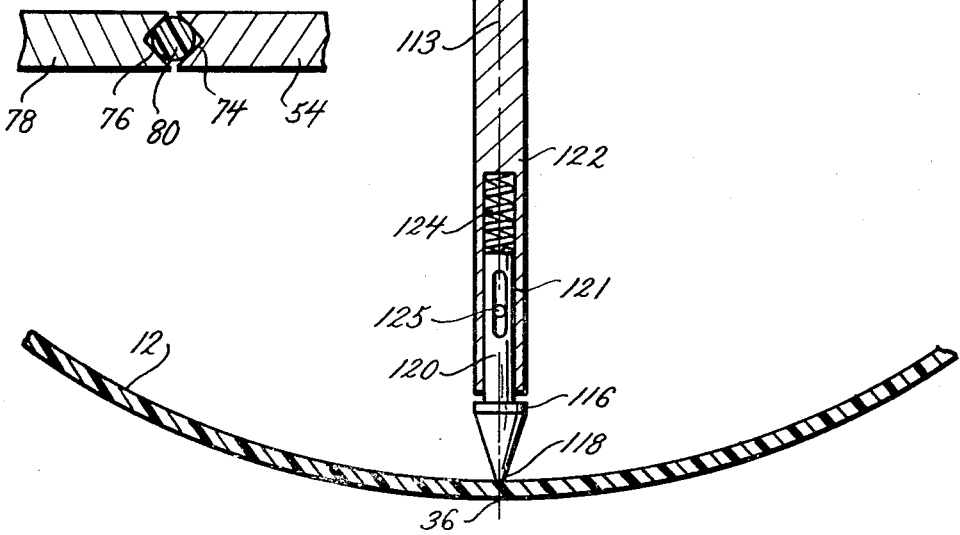

COORDINATE CONVERSION CALCULATOR

In certain geometrical problems it is desirable to provide directional information in the form of azimuth and elevation angles to computer means so they can perform certain predetermined operations thereon and arrive at solutions. In such instances, it is common to establish means which measure the elevation angle with respect to a nonstabilized platform and the azimuth angle with respect to a predetermined line on the nonstabilized platform which is taken as the 0° azimuth line, and feed such information to the computer means. To check the operation of the computer means with regards to a certain particular solution, it is sometimes desirable to refeed the same directional information into the computer means at a later time and compare the resultant solution with the original solution to see if a variance exists therebetween, which variance indicates that the computer means are operating improperly. Unfortunately the set of azimuth and elevation angles with respect to the nonstabilized platform which was fed to the computer means at a given instant is sometimes difficult or impossible to obtain directly, while a set of azimuth and elevation angles of the same direction with respect to a stabilized platform and the pitch and roll angles between the stabilized and nonstabilized platforms are relatively easy to obtain. When the two platforms have 0° azimuth lines thereon which always lie on a plane that is projected perpendicularly from the stabilized platform, the two sets of azimuth and elevation angles mentioned above with respect to the stabilized and nonstabilized platforms are related by the equations:

$$\lambda_a = \tan^{-1}\left(\frac{\cos E_s \sin A_s \cos\phi + \cos E_s \cos A_s \sin\theta \sin\phi - \sin E_s \cos\theta \sin\phi}{\cos E_s \cos A_s \cos\theta + \sin E_s \sin\theta}\right)$$

$$\lambda_e = \sin^{-1}(\cos E_s \sin A_s \sin\phi - \cos E_s \cos A_s \sin\theta \cos\phi + \sin E_s \cos\theta \cos\phi)$$

where:

$\lambda_a$ is the azimuth angle of the direction relative to the 0° azimuth line on the nonstabilized platform, $\lambda_e$ is the elevation angle relative to the nonstabilized platform, $A_s$ is the azimuth angle relative to the 0° azimuth line on the stabilized platform, $E_s$ is the elevation angle relative to the stabilized platform $\theta$ is the pitch angle of the 0° azimuth line on the nonstabilized platform relative to the 0° azimuth line on the stabilized platform, and $\phi$ is the roll angle of the nonstabilized platform relative to the stabilized platform, and therefore it is possible to convert from one set of angular coordinates to the other. To do so by hand, however, as can be surmised from the equations is time consuming and tedious, and the chance for human error is large. The coordinate conversion can also be accomplished through the use of electronic computers but computers sophisticated enough to handle the above equations are relatively expensive and also require power sources and therefore are not suitable for certain applications including those in remote locations.

The disadvantages and shortcomings of the methods and means heretofore employed to convert between sets of angular coordinates such as those related by the above equations are solved by the present device which is a relatively inexpensive device, requiring no power source, and which produces acceptably accurate results.

The subject calculator includes a mechanical gimbal assembly and a system of scales and pointers which allow a mechanical analog of the desired geometrical problem to be set up. The gimbal assembly is manipulated by adjustment means associated therewith until it simulates the known pitch-and-roll relationships that existed between the two platforms at the given instant for which the set of coordinates with respect to one of the platforms is known. Portions of the gimbal assembly are then adjusted until certain scales and pointers associated therewith indicate that the desired physical relationship exists between direction simulating means included with the gimbal assembly and the platform from which the known angular coordinates were measured. The angular coordinates with respect to the other platform are then indicated by other scales and pointers also associated with the direction simulating means and hence the desired angular coordinate conversion is accomplished. This can be done simply and mechanically using the subject device. Even though the primary purpose of the subject calculator is to solve the above stated equations for $\lambda_1$ and $\lambda_e$, the calculator can also be used to find any two of the six variables ($\lambda_a$, $\lambda_e$, $E_s$, $A_s$, $\theta$, $\phi$) which appear in the equations once the other four are known and set therein or it can be used as a visual teaching aid to demonstrate the angular relationships between various planes and vectors therefrom.

It is therefore a principal object of the present invention to provide means for converting between different sets of angular coordinates.

Another object of the present invention is to provide angular coordinate conversion means which are accurate and relatively inexpensive.

It is another object of the present invention to provide coordinate conversion means which are easy to operate and which require relatively little skill and training to operate.

Another object of the present invention is to provide an angular coordinate calculator which is mechanical in nature and which requires no outside power source.

Another object of the present invention is to provide means for reconstructing input information fed to computer means for use in checking the outputs and hence the operation and accuracy of the computer means.

Another object of the present invention is to provide means for converting easily observable angular coordinates of a direction into angular coordinates of a different angular coordinate system which are relatively more difficult to observe or discover.

Another object of the present invention is to provide means for visually displaying the differences between selected sets of coordinates of different coordinate systems so that the differences and interactions therebetween can be easily visualized.

These and other objects and advantages of the present invention will become apparent after considering the following detailed specifications which covers a preferred embodiment thereof in conjunction with the accompanying drawings wherein:

FIG. 8 is a cross-sectional view taken at line 8—8 of FIG. 6;

FIG. 9 is an enlarged fragmentary view of a portion of FIG. 8; and,

Figure 1:
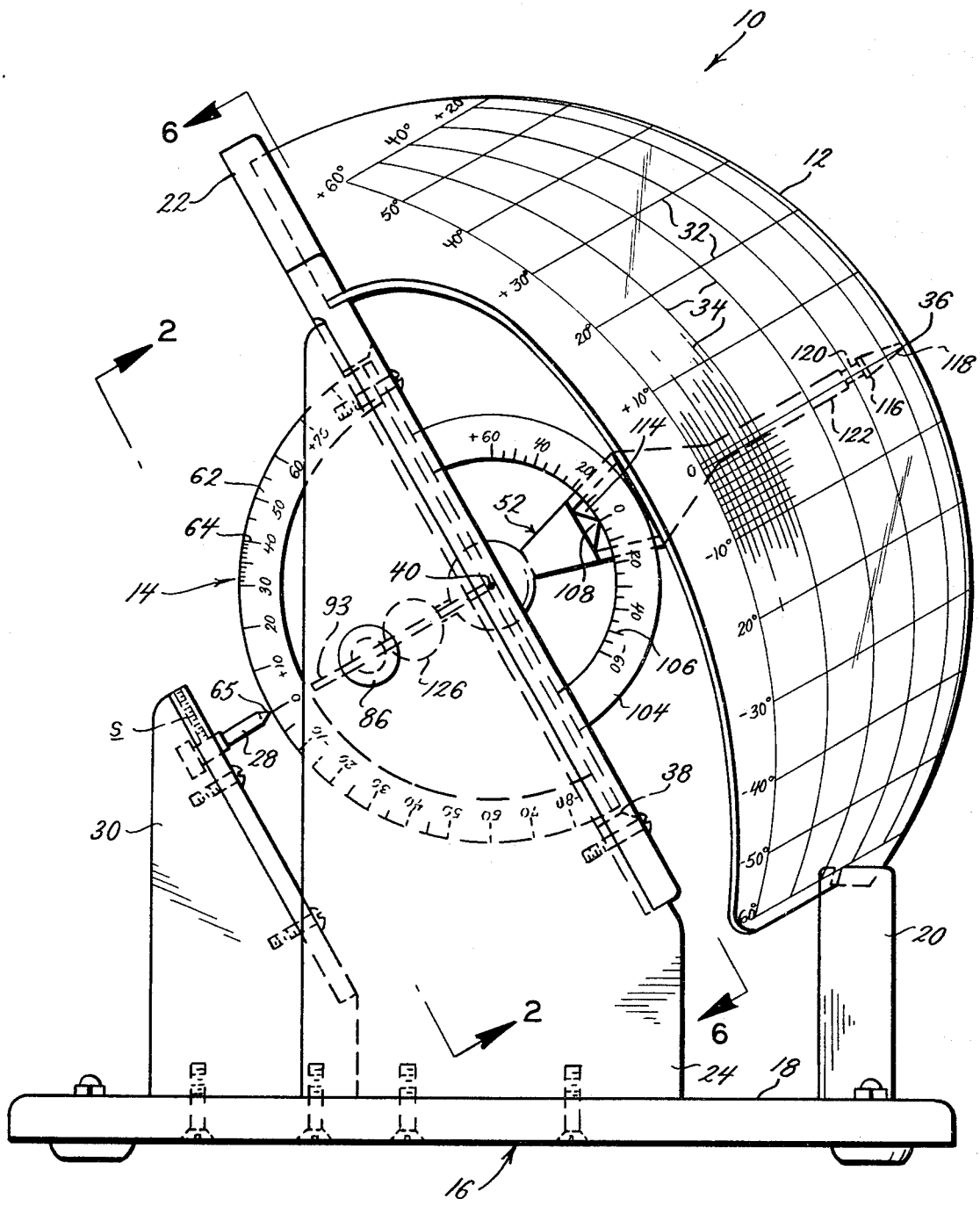
FIG. 1 is a side elevational view of the subject calculator showing the operative portions thereof in their centered positions.

Referring to the drawings more particularly by reference numbers, the number 10 in FIG. 1 refers to an angular coordinate conversion calculator constructed according to the present invention. The calculator 10 includes a fixed and scaled transparent coordinate member 12, a gimbal assembly 14 and supporting structure 16 for the various components of the calculator. The supporting structure 16 includes a base 18, a lower coordinate member support block 20 connected thereto, and an upper support member 22 which is supported above and at an angle to the base 18 by upstanding members 24 and 26. The supporting structure 16 also includes a pitch indicator pointer 28 and a support 30 therefor which pointer 28 will be discussed more in detail later.

The coordinate member 12 is fixed in a predetermined position with respect to the gimbal assembly 14 and the pitch indicator pointer 28 by the lower coordinate member support block 20 and the upper support member 22 to which it is attached. Lines 32 and 34 are inscribed on the inner or outer surface of the coordinate member 12 to form elevation and azimuth scales thereon. The lines 32 and 34 represent elevation and azimuth angles which correspond to the angular coordinates $E_s$ and $A_s$ in the above stated equations which are of course the angular coordinates with respect to the stabilized platform which will be described more in detail hereinafter. The coordinate member 12 is preferably constructed to be a segment of a sphere and when so constructed the elevation lines 32 and the azimuth lines 34 inscribed thereon correspond to or are similar to latitude and longitude lines on a globe. The lines 32 and 34 are shown calibrated in degrees although radians or any other suitable angular measure could be used as is also true with all of the scales associated with the subject calculator 10.

The center 36 of the coordinate member 12 is the 0° point for both the elevation and azimuth scales, and for convenience the elevation and azimuth scales extend 60° in all directions from the 0° point as shown. The 120° range of angles defined by the scale lines 32 and 34 can be increased or decreased without substantial modification to the calculator 10 as desired. The elevation lines 32 above the 0° elevation line are indicated as being positive (+) while the elevation lines 32 below the 0° elevation line are negative elevation lines (−). The azimuth lines 34 shown in FIG. 1 which are to the left of the 0° azimuth or heading line when looking at the coordinate member 12 from the convex or front side thereof represent positive (+) azimuth angles from the aforementioned 0° azimuth line on the stabilized platform while the lines 34 on the right side of the 0° azimuth line indicate negative (−) azimuth angles therefrom. The portions of the scales on the coordinate member 12 which are positive or negative can be arbitrarily chosen initially as long as the other scales of the calculator 10 to be described are assigned positive and negative signs which are consistent therewith, and it should be remembered that this specification describes only only one of many possible consistent arrangements for the polarities of the scales. The coordinate member 12 and the selected portions of the supporting structure 16 are preferably constructed from a transparent material such as Plexiglas so that the gimbal assembly 14 and the scales on the coordinate member 12 are visible in all positions of the members.

Figure 10:
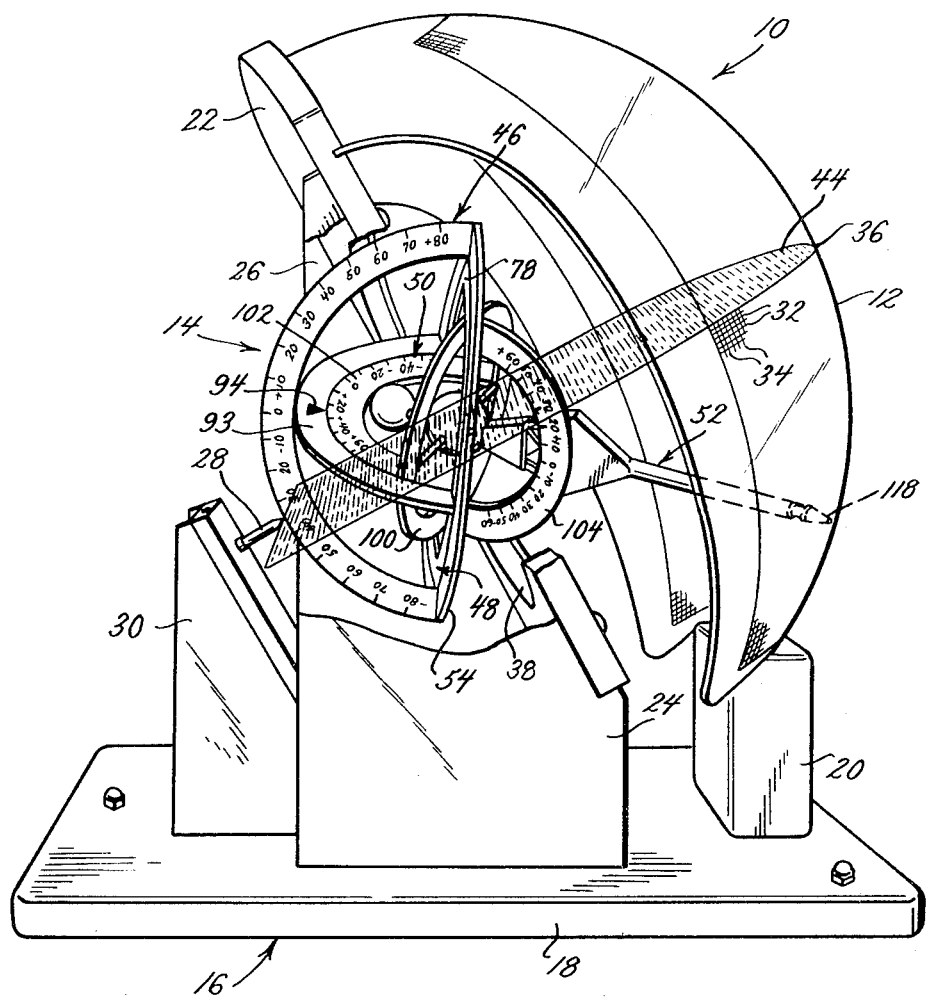
FIG. 10 is a perspective view of the subject calculator showing the movable parts thereof in different positions for solving coordinate conversion problems.

The upper support member 22 which supports the upper portion of the coordinate member 12 includes an opening 38 through the center portion thereof. The gimbal assembly 14 is spaced from and is pivotally supported in the opening 38 by spacers 39 (FIG. 8) and by a pair of axially aligned journals 40 and 42 whose axes are horizontal to the base 18 and which pass through the center of motion 43 of the gimbal assembly 14. The stabilizer platform is not present physically in the subject device but it can be visualized by imagining a plane 44, which is shown in FIG. 10, extending from the pitch indicator pointer 28 to the 0° elevation line on the coordinate member 12. The axes of the journals 40 and 42 and the center of motion 43 all lay on this imaginary, stabilized platform simulating plane 44. The entire gimbal assembly 14 is rotatable about the journals 40 and 42 and hence with respect to the imaginary plane 44 to thereby enter the pitch angle information $\theta$ into the calculator 10. The assembly 14 can be manually rotated or it can be rotated by means of optional pitch angle adjustment means 45 which are shown as a gear assembly associated with the journal 42 (FIG. 8) and which will be described more in detail hereinafter.

Figure 6:
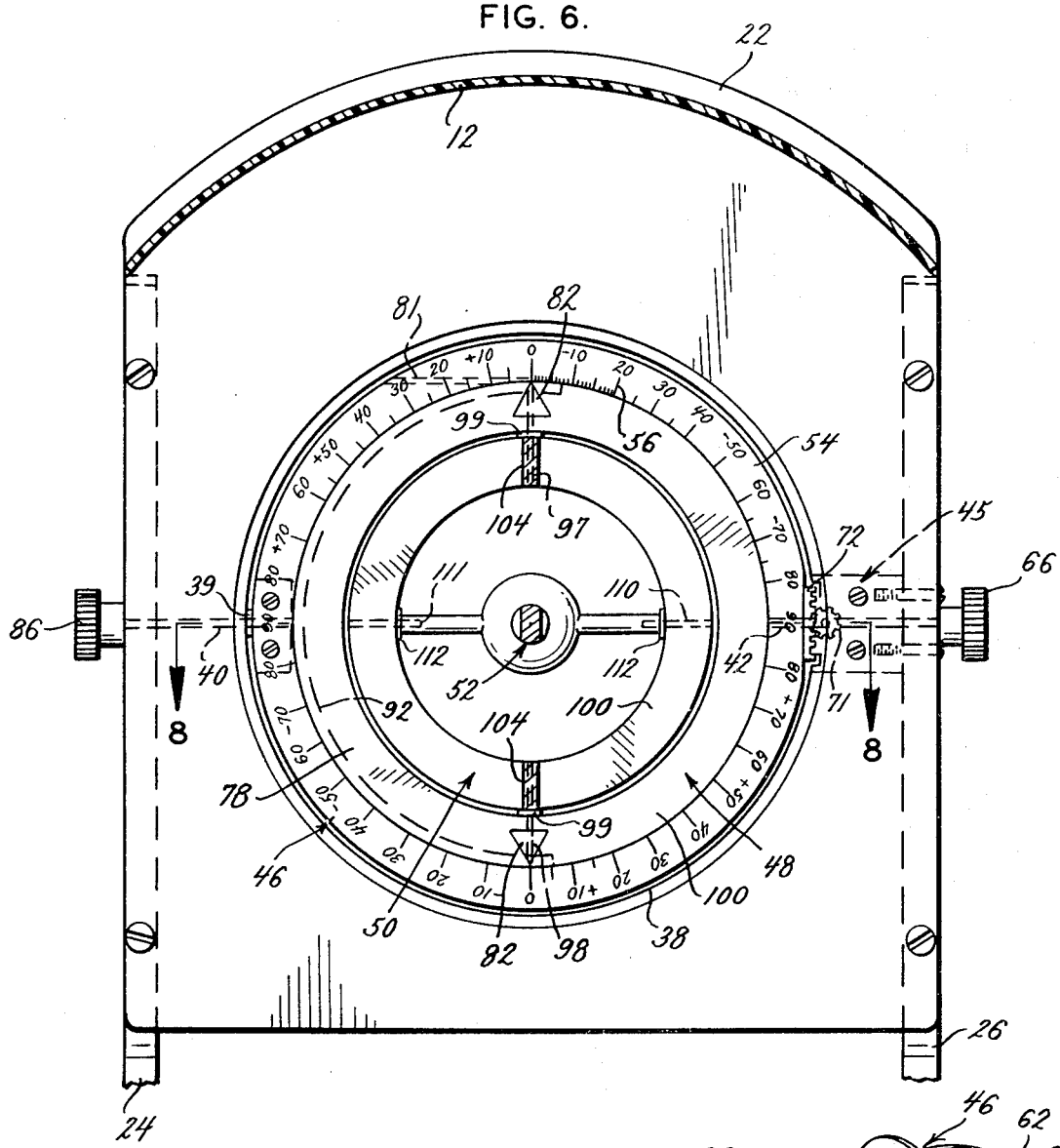
FIG. 6 is a cross-sectional view of the subject calculator taken at line 6—6 of FIG. 1.
Figure 7:
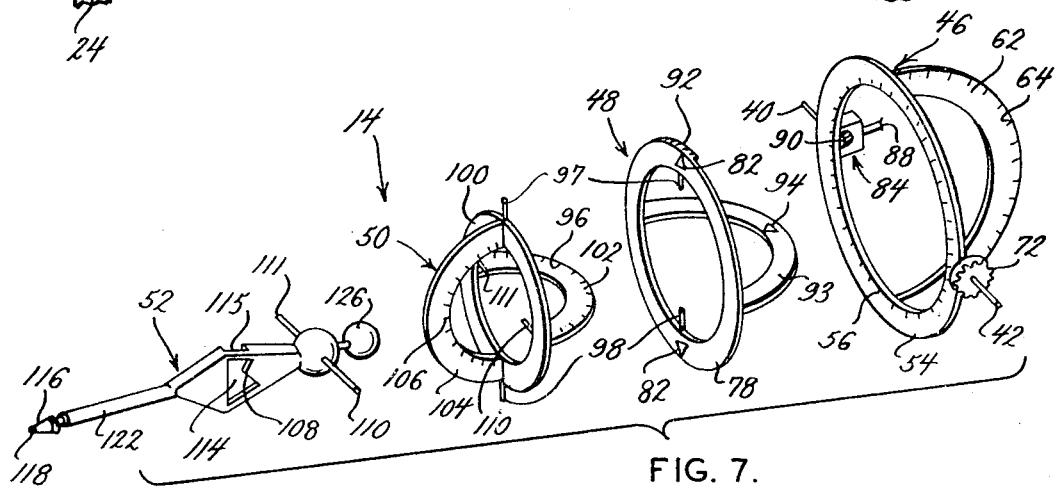
FIG. 7 is an exploded view of the gimbal assembly of the subject calculator showing the scales, indicators, pointers and pivots associated therewith.

Referring to FIG. 7 which is an exploded view of the gimbal assembly 14, the gimbal assembly 14 includes outer, middle and inner gimbal members 46, 48 and 50 respectively, and a coordinate pointer 52 which make up the operative portions thereof. The outer gimbal member 46 includes a flat annular ring portion 54 which is pivotally mounted to the upper support member 22 by the aforesaid aligned journals 40 and 42 so that the axes thereof are coexistent with a diameter of the ring portion 54. An annular roll scale 56 calibrated in degrees is positioned on one or both flat surfaces of the ring portion 54. As shown, the roll scale 56 is oriented so the +90° and the −90° indications thereof are located adjacent to the journals 40 and 42 respectively, and the 0° indications thereof are located on a diameter of the ring portion 54 which is at right angles to the diameter on which the +90° and −90° indications are located. The roll scale 56, although shown in FIG. 6 as being calibrated from 0° at the top thereof through ±90° and back to 0° at the bottom thereof, can also be calibrated from 0° at the top to ±180° at the bottom for convenience in solving problems where the stabilized and nonstabilized platforms are oriented with a roll angle of more than 90° therebetween. These last mentioned problems can of course be solved with the calculator 10 as shown by mental conversions of the roll angles as required. Extending outwardly from the 0° indications of the roll scale 56 and at right angles to the ring portion 54 is a flat semicircular ring portion 62 which includes a pitch scale 64 on one or both sides thereof. The pitch scale 64 is calibrated in degrees from +90° to −90° with the 0° indication thereof on a radius which bisects the semicircular ring portion 62. As shown in FIG. 1, positive (+) pitch angles are indicated on the upper segment or half of the portion 62 while negative pitch angles are indicated on the lower segment thereof. The pitch scale 64 cooperates with the aforementioned pitch indicator pointer 28 to indicate the pitch angle $\theta$ at which the nonstabilized platform simulating portion of the gimbal assembly 14 is pivoted with respect to the aforesaid stabilized platform simulated by the imaginary plane 44. The pitch indicator pointer 28 is fixed by the supporting structure 16 and is always adjacent to the semicircular ring portion 62 because the longitudinal axis of the pointer 28 extends through the center of motion 43 of the assembly 14 and is at a right angle to the axes of the journals 40 and 42 on which the gimbal assembly 14, of which the semicircular ring portion 62 is a part, pivots. The pointer support 30 may include means such as a set screw S which allows longitudinal adjustment of the pointer 28 so that the end 65 thereof can be adjusted into as close a proximity to the semicircular ring portion 62 as desired.

The optional pitch adjustment means 45 as aforesaid enable precise adjustment of the pitch angle $\theta$ between the stabilized and nonstabilized platform simulating means employed in the subject calculator 10. The pitch adjustment means 45 which are shown in detail in FIGS. 2 and 3 include a knob 66 journaled for rotation in a portion of the upstanding member 26 and in a portion of the upper support member 22. Turning the knob 66 rotates the gimbal assembly members 46, 48 and 50 as a unit through a shaft 67, which has a bevel gear 68 on the opposite end thereof from the knob 66. Another bevel gear 69 is mounted on the end of another shaft 70 and it meshes with gear 68. Mounted on the other end of shaft 70 is a gear 71 which meshes with gear 72 which is secured to the ring portion 54 of gimbal member 46.

As shown in detail in FIGS. 8 and 9 the inner edge of the annular ring portion 54 includes an annular V-shaped groove 74 which is positioned in opposition to a similar annular V-shaped groove 76 formed in the outer edge of another flat annular ring portion 78 which is part of the middle gimbal member 48. The grooves 74 and 76 are held in alignment by bearing means which can be a plurality of ball bearings or the long flexible cylindrical member 80 as shown. The cylindrical member 80 may be constructed from any suitable bearing material such as Nylon and it is placed between the grooves 74 and 76 through a bore 81 (FIG. 6) which extends through the annular ring portion 54 to the groove 74. The grooves 74 and 76 and the member 80 therebetween enable coplanar concentric rotation between the outer and middle gimbal members 46 and 48 so that a roll angle $\phi$ can be established therebetween.

The ring portion 78 of the gimbal member 48 includes two roll indicator pointers 82 located on a diameter thereof and on one or both opposite sides thereof. The roll indicator pointers 82 cooperate with the roll scale or scales 56 on the outer gimbal member 46 to indicate the roll angle $\phi$ of the nonstabilized platform with respect to the stabilized platform represented by the plane 44.

Figure 2:
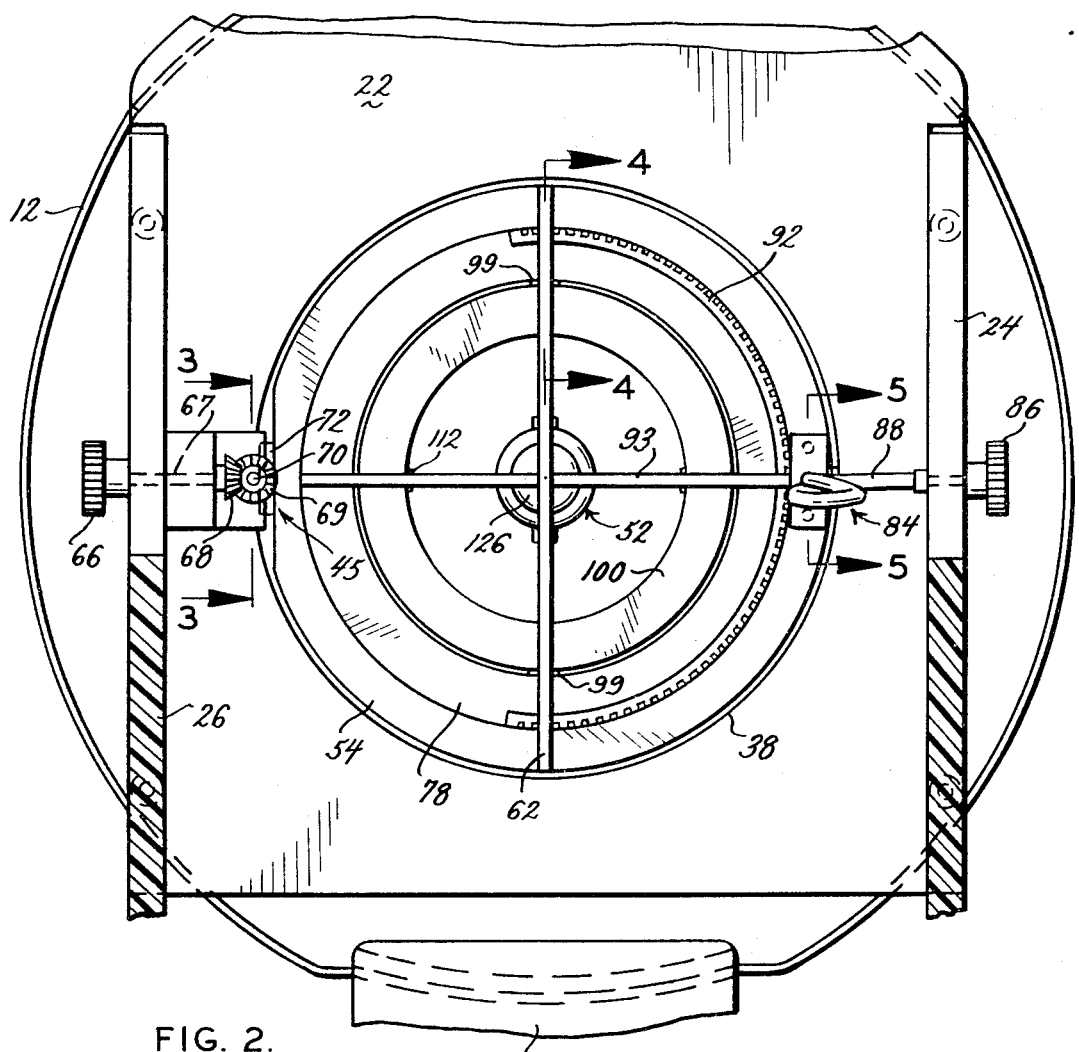
FIG. 2 is a cross-sectional view of the subject calculator taken at line 2—2 of FIG. 1.
Figure 3:
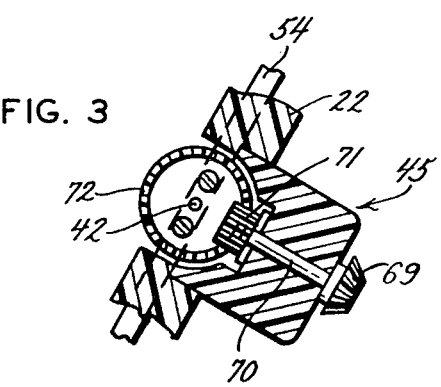
FIG. 3 is an enlarged fragmentary cross-sectional view taken at line 3—3 of FIG. 2.
Figure 5:
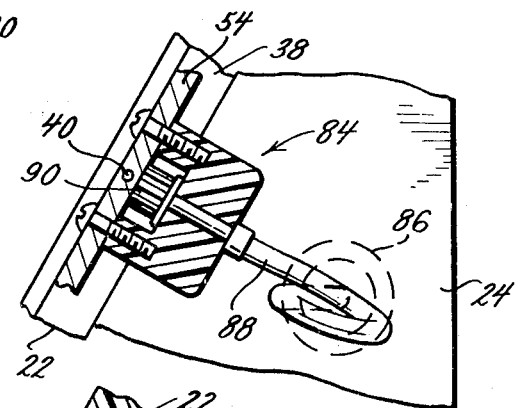
FIG. 5 is an enlarged fragmentary cross-sectional view taken at line 5—5 of FIG. 2.

The middle and inner gimbal members 48 and 50 can be rotated as a unit to establish a roll relationship between the two platforms manually by moving the members themselves or by means of optional roll adjustment means 84 which are shown in FIGS. 2 and 5 connected between the outer and middle gimbal members 46 and 48. The roll adjustment means 84 include a knob 86 rotatably mounted on the support members 22 and 24, which is connected by a flexible drive shaft 88 to a pinion gear assembly 90 mounted on the outer gimbal member 46. The pinion gear assembly 90 when rotated by the rotation of the knob 86 drives a rack gear 92 formed on the outer edge of the middle gimbal member 48 to rotate it with respect to the outer gimbal member 46 to establish the desired roll relationship therebetween. The rack gear 92 is shown extending through an arc of 180° which allows roll adjustment of 90° to either side of the 0° roll position. If the roll scale 56 is calibrated to extend to plus and minus 180° rack gear 92 can be constructed to extend completely around the middle gimbal member 48 thus allowing 360° of roll adjustment.

The middle gimbal member 48 also includes a semicircular ring portion 93 which extends outwardly at a right angle to the ring portion 78 on a diameter thereof as shown in FIG. 7. The semicircular ring portion 93 includes an azimuth ($\lambda_a$) indicator pointer 94 on its bisecting radius which pointer cooperates with an azimuth ($\lambda_a$) scale 96 on a portion of the inner gimbal member 50 which will be described hereinafter. The semicircular ring portion 93 is the portion of the subject calculator 10 which physically simulates the nonstabilized platform. As can be seen in FIG. 1 the ring portion 93 is coexistent with the imaginary stabilized platform 44 when the pitch angle $\theta$ and the roll angle $\phi$ therebetween are 0°. By changing the pitch and roll angles, any desired relationship can be established between the two platforms.

Figure 4:
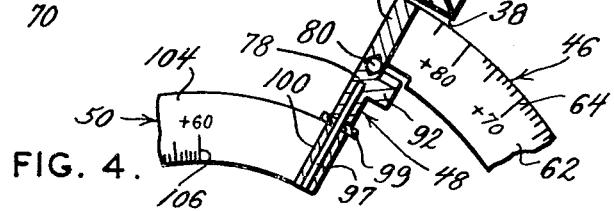
FIG. 4 is an enlarged fragmentary cross-sectional view taken at line 4—4 of FIG. 2.

The middle gimbal member 48 (FIGS. 4 and 7) also includes journals 97 and 98 which are axially aligned on the same diameter thereof as the diameter on which the roll indicator pointers 82 are positioned. The journals 97 and 98 pivotally connect the inner gimbal member 50 to the middle gimbal member 48. Spacer members 99 are provided with the journals to maintain a proper operating clearance between the members 48 and 50.

The inner gimbal member 50 includes a flat annular ring portion 100 and two semicircular ring portions 102 and 104. The first semicircular ring portion 102 extends outwardly at right angles from the ring portion 100 and at right angles from the diameter thereof which is aligned with the axes of the journals 97 and 98 and it has the aforementioned azimuth ($\lambda_t$) scale 96 formed thereon. The second semicircular ring portion 104 extends outwardly at right angles to the ring portion 100 but on the opposite side of the ring portion 100 from the first semicircular portion 102, and the portion 104 is aligned with the axes of the journals 97 and 98. The second semicircular ring portion 104 has an elevation ($\lambda_e$) scale 106 formed thereon. Both scales 96 and 106 are shown calibrated in degrees and both have their 0° marks on radii thereof which bisect the respective semicircular ring portions 102 and 104.

The polarity of the scales 96 and 106 are as shown in FIGS. 8 and 1, respectively. The azimuth scale 96 and the azimuth indicator pointer 94 on the portion 93 of the middle gimbal member 48 cooperate to indicate the azimuth angle $\lambda_a$ of the direction of interest with respect to the nonstabilized platform while the elevation scale 106 cooperates with an elevation indicator pointer 108 on the coordinate pointer 52 (FIGS. 1 and 7) to indicate the elevation angle $\lambda_e$ of the direction of interest with respect to the same nonstabilized platform.

The coordinate pointer 52 which is the direction simulating portion of the present invention is mounted in the center of the ring portion 100 on journals 110 and 111 (FIG. 7) which are axially aligned with the diameter of the ring portion 100 at the locations thereon from which the first semicircular ring portion 102 extends. The coordinate pointer 52 is mounted for axial rotation about the journals 110 and 111 and spaced by spacers 112 in such a manner that the axis 113 of the coordinate pointer 52 (FIG. 8), which simulates the aforesaid direction, always passes through the center of motion 43 of the gimbal assembly 14. The coordinate pointer 52 includes the aforementioned elevation indicator 108 which is aligned with the axis 113 of the coordinate pointer 52 and which is formed in a cutout 114 in the coordinate pointer 52 adjacent to a transverse channel or groove 115 in which the second semicircular ring portion 104 of the inner gimbal member 50 and its associated elevation scale 106 slides. The outermost extremity of the coordinate pointer 52 includes means aligned on the axis 113 including an outwardly biased pointer member 116 which cooperates with the coordinate member 12 to indicate the azimuth and elevation angles $A_s$ and $E_s$ of the direction of interest (which is the direction in which the pointer 52 is pointing) with respect to the stabilized platform. The biased pointer member 116 preferably include an antifriction tip 118 constructed of a material such as Nylon so it will not scratch the coordinate member 12 when it is moved from one position thereon to another. The pointer member 116 also includes a shaft portion 120 which extends into a bore 121 in the body portion 122 of the coordinate pointer 52. As shown in FIG. 8, a spring 124 is located in the bore 121 between the bottom thereof and the shaft portion 120 to outwardly bias the pointer member 116 into engagement with the member 12. Means such as slot and pin 125 can also be included to retain the pointer 116 in the coordinate pointer 52. The coordinate pointer 52 may also include counter balance means 126 located on the opposite end thereof from the pointer 116 to minimize any tendency for the coordinate pointer 52 to move once it has been set in a desired position. The counter balance means 126 are shown threadably attached to the body 122 of the coordinate pointer 52 but they may be otherwise attached thereto or even constructed integrally therewith, if desired.

Although as aforesaid the calculator 10 can be used to solve the equations:

$$\lambda_a = \tan^{-1}\left(\frac{\cos E_s \sin A_s \cos \phi + \cos E_s \cos A_s \sin \theta \sin \phi - \sin E_s \cos \theta \sin \phi}{\cos E_s \cos A_s \cos \theta + \sin E_s \sin \theta}\right)$$

$$\lambda_e = \sin^{-1}(\cos E_s \sin A_s \sin \phi - \cos E_s \cos A_s \sin \theta \cos \phi + \sin E_s \cos \theta \cos \phi)$$

for any two of the six variables ($\lambda_a$, $\lambda_e$, $A_s$, $E_s$, $\theta$, $\phi$), it is normally expected that the calculator will be used to solve for $\lambda_a$ and $\lambda_e$ when $A_s$, $E_s$, $\theta$ and $\phi$ are known.

FIG. 10 shows an example of a coordinate conversion using the subject calculator when the known quantities are:

$\theta = -33°$
$\phi = 31°$
$A_s = 33°$
$E_s = -38°$

To perform this conversion using the subject calculator 10, the gimbal assembly 14 is first pivoted manually, or by means of the optional pitch adjustment means 45, until the known pitch angle $\theta$ which is $-33°$ on the pitch scale 64 is aligned with the pitch indicator pointer 28. This establishes a $-33°$ pitch angle between the imaginary plane 44 which simulates the stabilized platform and the semicircular ring portion 93 which simulates the nonstabilized platform.

The middle and inner gimbal members 48 and 50 are then rotated as a unit manually, or by means of the optional roll adjustment means 84 until the roll indicator pointers 82 (more clearly seen in FIG. 6) on the middle gimbal member 48 are aligned with the known roll angle $\phi$ of 31° on the roll scale 56 which is located on the ring portion 54 of the outer gimbal member 46. This establishes a 31° roll angle between the stabilized and nonstabilized platform simulating means 44 and 93 while maintaining the same heading orientation for both.

The point on the coordinate member 12 which corresponds to the known azimuth and elevation angles $A_s=33°$ an $E_s=-38°$ of the desired direction with respect to the simulated stabilized platform is then located on the member 12 by means of the elevation and azimuth lines 32 and 34 thereon. This point is marked in some convenient fashion such as with a marking pencil (not shown). The coordinate pointer 52 is then moved until the tip 118 of the pointer 116 abuts the coordinate member 12 at the marked point corresponding to the angles $A_s=33$ and $E_s=-38°$. The coordinate pointer 52 is now at a point where it is simulating the desired direction with respect to both the nonstabilized and the stabilized platforms. The azimuth angle $\lambda_a$ of the desired direction with respect to the nonstabilized platform is then indicated by the relative positioning of the azimuth indicator 94 on the middle gimbal member 48 and the azimuth scale 96 on the inner gimbal member 50 and is shown as being approximately 26°. The elevation angle $\lambda_e$ of the desired direction with respect to the nonstabilized platform is indicated by the relative positioning of the elevation indicator 108 which is part of the coordinate pointer 52 and the elevation scale 106 on the inner gimbal member 50 and is shown as being approximately 5°.

Of course, by setting the pitch and roll angles $\theta$ and $\phi$ and by moving the coordinate pointer 52 until the indicator pointers 94 and 108 and the associated scales 96 and 106 indicate known angles $\lambda_a$ and $\lambda_e$ and thereafter by observing the resulting position of the coordinate pointer 52 with respect to the coordinate member 12, the coordinate conversion can be accomplished in the other direction to find the angles $A_s$ and $E_s$. Although some trial and error manipulation and some practice may be required to obtain the desired results, it is possible with the subject coordinate conversion calculator means 10 to find any two of the variables $\lambda_a$, $\lambda_e$, $A_s$, $E_s$, $\theta$ and $\phi$ if the other four are known.

There are many possible uses and applications for which calculators such as the present calculator could be used, and it is not intended to restrict or limit the subject device to any particular use or application. For example, it can be used to solve navigational and astronomical problems where information referenced to one set of coordinates needs to be quickly and accurately converted to a different coordinate system, and to this end it can be used to solve various sighting, guidance and related types of problems. Also with minor changes the subject device including the various movable elements could be made to generate output signals to represent their position for feeding to a computer which is programmed to solve for the desired unknowns depending on the type of solution desired. Also various changes could be made to the subject calculator which will be apparent to those skilled in the art without departing from the spirit and scope of the invention including using other forms of pointers and indicator means, using a recalibrated flat coordinate member instead of one that is spherical in form, and using other forms of positioning means between the various components thereof to name just a few. All such changes, including variations, modifications, and adaptations thereof which do not depart from the spirit and scope of the invention are deemed to be covered by the invention which is limited only by the claims which follow.

What is claimed is:

1. Means for indicating the angular coordinates of a line in space with respect to a first plane in space and with respect to a second plane in space where the second plane can be oriented in different known orientations relative to the first plane about a common point fixed in said planes, said line extending through said common point, comprising platform means establishing a first coordinate system including the position and orientation of said first plane, means movable relative to the platform means for establishing any desired orientation of said second plane with respect to the first plane, said movable means including means for producing angular displacement of the second plane about two mutually perpendicular axes that pass through said common point, one of said axes lying in said first plane, cooperative means associated with said platform means and said movable means to indicate the angular orientation of the second plane relative to the first plane, other means movably associated with said platform for establishing and indicating the orientation of the line in said first coordinate system and with respect to said first plane, and other means associated with the movable means for establishing the orientation of the second plane for indicating the angular coordinates of the line with respect to the second plane.

2. The means defined in claim 1 wherein said platform means for establishing the position and orientation of the first plane include a support structure and a scale member fixedly attached thereto, said scale member having scales thereon calibrated to indicate the angular coordinates of the said line with respect to said first plane.

3. The means defined in claim 2 wherein said scale member is constructed from a transparent material having a portion of a spherical surface thereon on which the said scales are located.

4. The means defined in claim 2 wherein said means producing angular displacement of the second plane include a gimbal assembly having at least two relatively movable gimbal members, the first of which is journaled to said support structure for angular movement with respect thereto about one of said axes, said second gimbal member being journaled to said first gimbal member for angular movement with respect thereof and about the other of said axes.

5. The means defined in claim 4 wherein said gimbal assembly includes a pointer to indicate the direction of said line, and a third gimbal member journaled for angular movement relative to said second gimbal member, said third gimbal member having scales thereon which cooperate with said second gimbal member and with said pointer to indicate the angular coordinates of said line with respect to said second plane.

6. Mechanical calculator means for indicating any two of six variables in the equations $$\lambda_a = \tan^{-1}\left(\frac{\cos E_s \sin A_s \cos\phi + \cos E_s \cos A_s \sin\theta \sin\phi - \sin E_s \cos\theta \sin\phi}{\cos E_s \cos A_s \cos\theta + \sin E_s \sin\theta}\right)$$

$$\lambda_e = \sin^{-1}(\cos E_s \sin A_s \sin\phi - \cos E_s \cos A_s \sin\theta \cos\phi + \sin E_s \cos\theta \cos\phi)$$

when the other four variables are set in said means, where the variables $A_s$ and $\lambda_a$ are azimuth angles of a direction in space in first and second coordinate systems respectively, the variables $E_s$ and $\lambda_e$ are elevation angles of the same direction in space with respect to said first and second coordinate systems respectively, and the variables $\theta$ and $\phi$ are perpendicular angular relationships defining the angular relationships between the two coordinate systems, including support structure means establishing the first coordinate system including establishing a first relatively fixed plane of reference for said first coordinate system, movable means associated with said support structure means for establishing the second coordinate system including establishing a second plane of reference that intersects the first plane of reference at a common point in both said first and second planes of reference, adjustment means associated with said support structure means for establishing the direction in space with respect to said first and second planes of reference, said direction in space passing through said common point, first and second scale means including cooperating relatively movable members associated with the support structure means and with the movable means associated therewith for indicating respectively the angles $\theta$ and $\phi$ between the first and second planes of reference, third and fourth scale means including cooperating relatively movable members associated with the support structure means and with the adjustment means for indicating respectively the azimuth angle $A_s$ and elevational angle $E_s$ of said direction in space with respect to said first plane of reference, and fifth and sixth scale means including cooperating relatively movable members associated with the movable means and with the adjustment means for indicating respectively the azimuth angle $\lambda_a$ and the elevation angle $\lambda_e$ of said direction in space with respect to said second plane of reference, any to unknown variables of said six variables being indicated by their respective scale means when the other four scale means are indicating the other four variables.

7. The means defined in claim 6 wherein said means for establishing the first plane of reference include a transparent member on which said third and fourth scale means are located.

8. The means defined in claim 7 wherein said transparent member is shaped and positioned so that all points at which said third and fourth scale means are located thereon are equidistant from said common point.

9. The means defined in claim 6 wherein said means for establishing said second plane of reference include a gimbal assembly on which said first, second, fifth and sixth scale means are located.

10. Means for converting between a set of known and a set of unknown coordinates, one set being the azimuth and elevation angles of a direction with respect to a first plane and the other set being the azimuth and elevation angles of the same direction with respect to a second plane whose orientation is related to the orientation of the first plane by known angles established therebetween about two mutually perpendicular axes, said coordinate converting means including a gimbal assembly defining a center point therein through which said perpendicular axes pass, said gimbal assembly including means to simulate the aforesaid direction which passes through said center point, said gimbal assembly also including other means to simulate said second plane, said other means being supported for movement about said center point, scale means positioned to be intersected by said simulated direction including a first set of scales, a portion of said first set of scales establishing the position of said first plane, said first set of scales being calibrated to indicate the azimuth and elevation angles of said direction from said center point and relative to said first plane, means associated with said gimbal assembly to establish predetermined orientations of said second plane with respect to said first plane, a second set of scales located on said gimbal assembly for indicating the angular relationships in azimuth and elevation angles of said direction with respect to said second plane, said converting means indicating the unknown set of coordinates when the known set of coordinates and the orientation of the second plane with respect to the first plane are established.

11. The means defined in claim 10 wherein said means to establish predetermined orientations of said second plane with respect to said first plane include first and second gear assemblies, said first gear assembly being movable to angularly rotate said means to simulate said second plane about one of said mutually perpendicular axes and said second gear assembly being movable to rotate said means to simulate said second plane about the other of said mutually perpendicular axes.

12. The means defined in claim 10 wherein said first set of scales includes a scale for indicating the azimuth angle of said direction with respect to said first plane which scale is formed by a family of lines which are the lines of intersection between said scale means and a family of coaxial planes whose common axis passes through said center point at right angles to said first plane.

13. The means defined in claim 10 wherein said first set of scales includes a scale for indicating the elevation angle of said direction with respect to said first plane which scale is formed by a family of lines which are the lines of intersection between said scale means and a family of parallel planes including said first plane.

14. The means defined in claim 10 wherein said means for simulating the direction include a pointer member pivotally connected to said gimbal assembly, said pointer member having means thereon engageable with said scale means to indicate the set of coordinates of said direction in space relative to said first plane, and wherein said gimbal assembly includes means thereon which cooperate with said pointer member to indicate the set of coordinates of said direction in space relative to said second plane.

15. The means defined in claim 14 wherein said pointer member is counterbalanced.

* * * * *

UNITED STATES PATENT OFFICE
CERTIFICATE OF CORRECTION

Patent No. 3,639,989　　　　　　　　　Dated February 8, 1972

Inventor(s) William E. Rapsilber & Richard E. Koenig

It is certified that error appears in the above-identified patent and that said Letters Patent are hereby corrected as shown below:

On the Title Page, show the "Assignee McDonnell Douglas Corporation, St. Louis, Missouri".

Column 2, line 7, "$\lambda_1$" should be "$\lambda_a$"

Column 5, line 31, after "180°" insert "the"; line 68, "$(\lambda_1)$" should be "$(\lambda_a)$".

Column 7, line 19, "33" should be "33°".

Column 8, line 39, "thereof" should be "thereto".

Signed and sealed this 12th day of September 1972.

(SEAL)
Attest:

EDWARD M. FLETCHER, JR.　　　　　　　ROBERT GOTTSCHALK
Attesting Officer　　　　　　　　　　Commissioner of Patents